United States Patent
Boianjiu

[11] Patent Number: 5,888,029
[45] Date of Patent: Mar. 30, 1999

[54] CUTTING INSERT HAVING PATTERNED HARD BOTTOM SURFACE FOR FORMING AN INDENTED SEAT ON A TOOL HOLDER

[75] Inventor: Gideon Boianjiu, Kfar Vradim, Israel

[73] Assignee: Iscar Ltd., Migdal Tefen, Israel

[21] Appl. No.: 102,081

[22] Filed: Jun. 22, 1998

Related U.S. Application Data

[60] Continuation of Ser. No. 871,536, Jun. 9, 1997, Pat. No. 5,820,310, which is a division of Ser. No. 606,148, Feb. 23, 1996, Pat. No. 5,682,803.

[30] Foreign Application Priority Data

Feb. 28, 1995 [IL] Israel ........................................ 112818

[51] Int. Cl.$^6$ ................................................. B23B 29/08
[52] U.S. Cl. ........................... 407/66; 407/101; 407/103; 407/107; 82/1.11
[58] Field of Search ............................. 407/66, 101, 102, 407/103, 104, 107, 113, 114, 118, 119, 120, 8; 82/1.11

[56] References Cited

U.S. PATENT DOCUMENTS

| | | | |
|---|---|---|---|
| 1,373,363 | 3/1921 | Shepardson | 407/120 X |
| 1,938,717 | 12/1933 | Oxford . | |
| 2,181,023 | 11/1939 | Moore . | |
| 2,779,992 | 2/1957 | Hayes | 407/107 |
| 3,369,283 | 2/1968 | Colding | 407/118 X |
| 4,189,264 | 2/1980 | Kraemer . | |
| 5,033,916 | 7/1991 | Dunklau . | |
| 5,090,280 | 2/1992 | Kosker . | |
| 5,100,269 | 3/1992 | Lyon et al. . | |
| 5,129,767 | 7/1992 | Satran et al. . | |
| 5,193,945 | 3/1993 | Nakayama et al. . | |
| 5,207,748 | 5/1993 | Kathi et al. . | |
| 5,421,679 | 6/1995 | Pantzar et al. | 407/113 X |
| 5,682,803 | 11/1997 | Boianjiu | 407/101 X |

FOREIGN PATENT DOCUMENTS

| | | |
|---|---|---|
| 213925 | 12/1957 | Australia . |
| 1084955 | 1/1955 | France . |
| 3617119 | 11/1987 | Germany . |
| 484238 | 11/1954 | Italy . |
| 1199468 A | 12/1985 | U.S.S.R. . |
| 667676 | 3/1952 | United Kingdom . |
| 844753 | 8/1960 | United Kingdom . |
| WO 94/15741 | 7/1994 | WIPO . |

*Primary Examiner*—Andrea L. Pitts
*Assistant Examiner*—Henry W. H. Tsai
*Attorney, Agent, or Firm*—Pennie & Edmonds LLP

[57] ABSTRACT

A cutting tool assembly comprising a tool holder formed with an insert retaining pocket having a pocket base wall and in which is releasably mounted a cutting insert and a shim. The cutting insert is of a substantially prismatic shape having an upper surface, a lower surface and side relief flank surfaces and at least one cutting corner defined therebetween and presenting at least one cutting edge formed by the intersection of the upper surface and a corresponding number of the side relief surfaces adjacent thereto. The shim generally correspondes in shape and size to the cutting insert, the insert and the shim being releasably mounted in the pocket by clamping means so that an upper supporting surface of the shim supports the lower surface of the cutting insert and a lower bearing surface of the shim bears against the pocket base wall at least a portion of the shim's lower bearing surface being formed, substantially in the region supporting the cutting corner, with a pattern of protrusions adapted to indent the pocket base wall.

16 Claims, 7 Drawing Sheets

CUTTING INSERT HAVING PATTERNED HARD BOTTOM SURFACE FOR FORMING AN INDENTED SEAT ON A TOOL HOLDER

RELATED APPLICATIONS

This is a continuation of application Ser. No. 08/871,536, filed Jun. 9, 1997, now U.S. Pat. No. 5,820,310, which is a divisional of application Ser. No. 08/606,148, filed Feb. 23, 1996, now U.S. Pat. No. 5,682,803.

FIELD OF THE INVENTION

This invention relates to chip cutting tool assemblies and, in particular, to cutting tool assemblies having replaceable cutting inserts for use, for example, in milling, drilling, boring, parting, grooving or turning operations.

BACKGROUND OF THE INVENTION

The cutting tool assembly of the kind to which the present invention applies comprises a tool holder formed with an insert retaining pocket and a cutting insert located therewithin so as to present an operative cutting corner and associated cutting edges. The cutting insert has a lower surface for bearing against the pocket's base wall either directly or indirectly via a correspondingly shaped and sized shim. A shim is typically prepared from a material harder than that from which a tool holder is prepared. As such, its use is preferable because it acts to absorb cutting forces, particularly the tangential component thereof, acting on an insert's operative cutting corner, thereby preventing damage to a relatively expensive tool holder. Mostly, the shim is independently secured into the retaining pocket by holding means such as split tubular pins, threaded sleeves, and the like whilst the cutting insert is secured therein by holding means such as locking screws, central locking pins, levers, wedges, clamps, and the like.

For the purpose of accurate positioning of a shim on a pocket's base wall and increasing the area of contact therebetween and with the cutting insert, it is common practice to grind the shim's upper and lower surfaces. In theory, this practice is designed to prevent the plastic deformation occurring at the front portion of a pocket's base wall supporting an insert's operative cutting corner as caused by the considerable bending moment thereon as applied by a cutting forces' tangential component. However, in practice, even the slightest deformation occurring at the front portion of a tool holder's pocket base wall leads to an unstable seating of a shim which, in turn, leads to vibrations during machining operations. As such, a shim can no longer act effectively as an absorbing cushion and the tool holder body is rendered of no further use.

It is therefore an object of the present invention to provide a new chip cutting tool assembly comprising a cutting insert and preferably a shim in which means are provided for substantially reducing or avoiding the above-referred disadvantage.

SUMMARY OF THE INVENTION

In accordance with the teachings of one aspect of the present invention, there is provided a cutting tool assembly comprising:

(a) a tool holder formed with an insert retaining pocket having a pocket base wall;

(b) a cutting insert of a substantially prismatic shape having an upper surface, a lower surface, side relief flank surfaces and at least one cutting corner defined therebetween and presenting at least one cutting edge formed by the intersection of said upper surface and a corresponding number of said side relief surfaces adjacent thereto; and (c) a shim generally corresponding in shape and size to said cutting insert, said cutting insert and said shim being releasably mounted in said pocket by clamping means so that an upper supporting surface of said shim supports said lower surface of said cutting insert and a lower bearing surface of said shim bears against said pocket base wall, at least a portion of said shim's lower bearing surface being formed, substantially in the region supporting said cutting corner, with a pattern of protrusions adapted to indent said pocket base wall.

In the cutting tool assembly designed in accordance with the teachings of the present invention, the tangential component of the cutting forces acting upon the cutting corner during machining operations causes the pattern of protrusions formed in the shim's lower bearing surface to indent the pocket's base wall. This arrangement has the beneficial effect of distributing the cutting forces' tangential component over a greater proportion of the pocket's base wall than as hitherto occurred, thereby effectively reducing stress on the pocket's base wall and eliminating the plastic deformation of its front portion as described hereinabove. Furthermore, the indentations once embedded in a pocket's base wall act to prevent any movement of the shim with respect to the insert receiving pocket, thereby providing a more stable seating of the shim. Thus, the teachings of the present invention utilize the cutting forces prevailing during a machining operation to its benefit.

The cutting insert used in the cutting tool assembly according to the present invention may be single- or double-sided. In both cases, the cutting insert's lower surface adjacent to its cutting corner is preferably formed with a recess whilst the shim's upper supporting surface is formed with an upward projection having tapering side walls for insertion thereinto. Engagement between the shim and the cutting insert takes place along the projection's tapering side walls and acts so as to inhibit displacement of the cutting insert relative to the shim by the action of the radial and feed force components of the cutting force during a machining operation.

In an alternative arrangement, particularly suitable for single-sided cutting inserts, a cutting insert's lower surface adjacent its cutting corner is provided with a downward projection for insertion into a recess provided on a shim's upper surface. Furthermore, in the case of double-sided cutting inserts, it is preferable that the engagement between a cutting insert and a shim is such that a cutting insert's inoperative lower cutting edges are elevated above its supporting shim to protect the same as proposed in the Applicant's co-pending U.S. patent application Ser. No. 08/341, 616 based on PCT/EP93/03713 incorporated herein by reference.

In accordance with another aspect of the present invention, there is provided a shim for use in a cutting tool assembly comprising a replaceable cutting insert having at least one cutting corner, the shim being of a shape and a size generally corresponding to those of said cutting insert, said shim having an upper surface for supporting the cutting insert, a lower bearing surface for bearing against a base wall of an insert receiving pocket of a tool holder of the cutting tool assembly and a shim corner adapted to support said cutting corner, at least a portion of said shim's lower bearing surface being formed, substantially in the region of said shim corner, with a pattern of protrusions adapted to indent said pocket base wall.

A cutting tool assembly according to the present invention may also be used without a shim. Thus, in accordance with a further aspect of the present invention, there is provided a cutting insert for use in a cutting tool assembly comprising a tool holder, the tool holder having an insert receiving pocket with a pocket base wall, the cutting insert having an upper surface, a lower surface and side relief flank surfaces and at least one cutting corner defined therebetween and presenting at least one cutting edge formed by the intersection between said upper surface and a corresponding number of said side relief surfaces adjacent thereto, said lower surface being adapted to bear against said pocket base wall and being formed, at least substantially in the region of said cutting corner, with a pattern of protrusions adapted to indent said pocket base wall.

Preferably, the cutting insert designed for use according to all the above aspects of the present invention has a plurality of cutting corners indexable into an operative position, thereby presenting successive operative cutting edges. As such, the cutting insert can be fashioned so as to be of any conventional shape including, but not limited to, a trigon shape, a parallelogram shape, and the like.

BRIEF DESCRIPTION OF THE DRAWINGS

For a better understanding of the present invention and to show how the same can be carried out in practice, by way of non-limiting example, reference will now be made to the accompanying drawings in which.

DETAILED DESCRIPTION OF PREFERRED EMBODIMENTS

Figure 1:
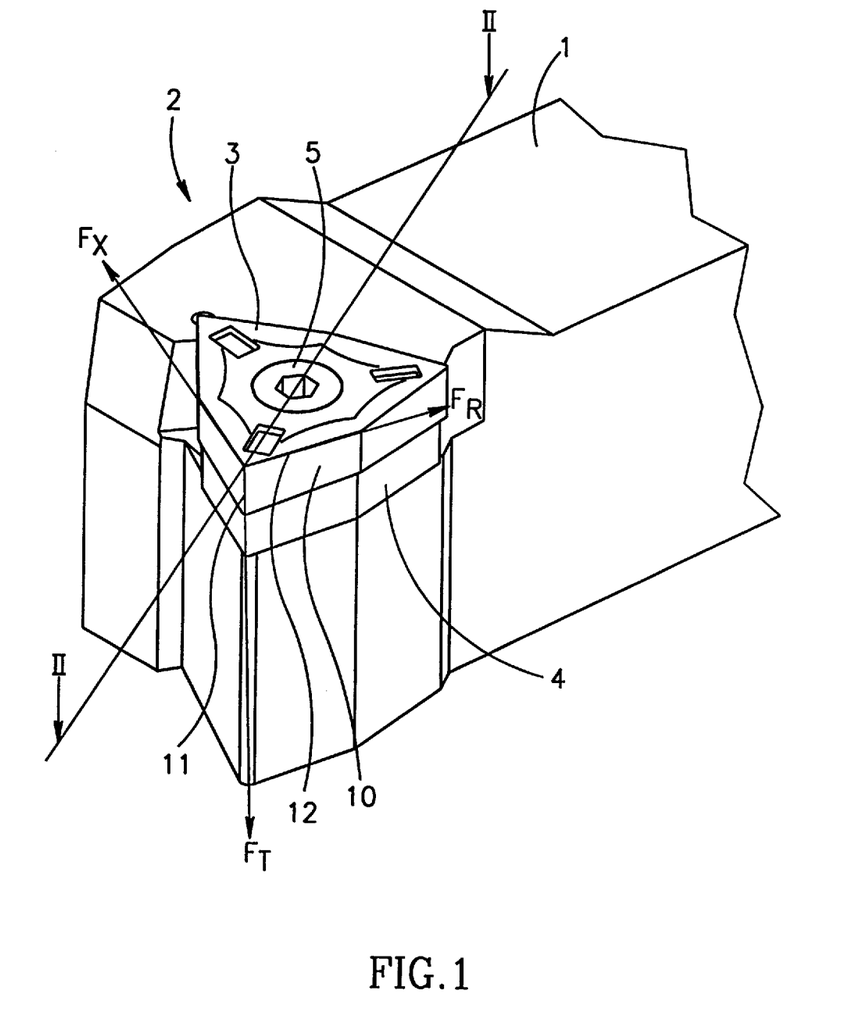
FIG. 1 is a perspective view of a turning toolholder assembly of the kind to which the present invention refers including a double-sided cutting insert and showing the components of the cutting force acting upon its operative cutting corner during a machining operation.
Figure 2:
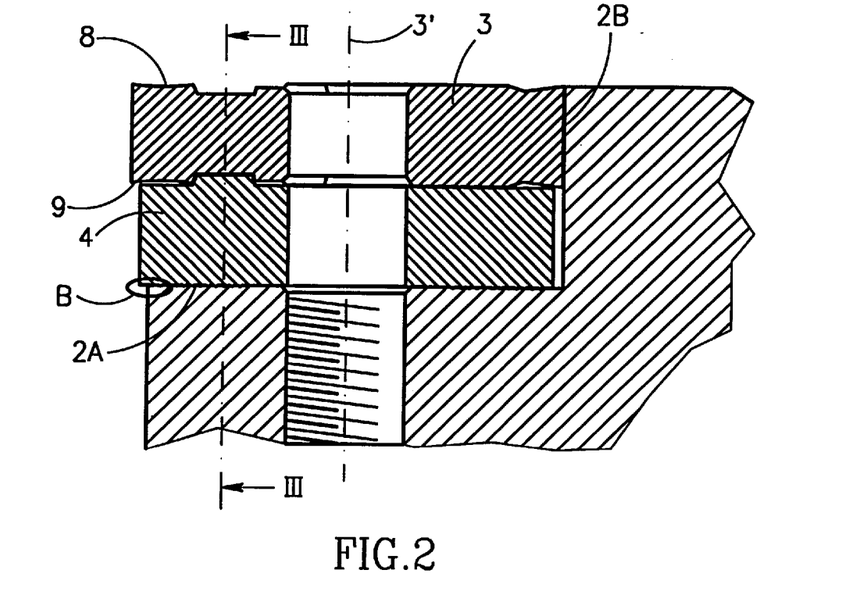
FIG. 2 is a cross-sectional view of the turning toolholder assembly shown in FIG. 1 as taken along line II—II.

FIGS. 1 and 2 show a cutting tool assembly of the kind to which the present invention refers comprising a tool holder 1 formed with an insert retaining pocket 2 defined by a substantially smooth, planar pocket base wall 2A and a pocket side wall 2B, a replaceable double-sided cutting insert 3 and a shim 4. The cutting insert 3 and the shim 4 are clampingly retained within the pocket 2 by means of a clamping screw 5.

The cutting insert 3 is of a substantially prismatic shape having an upper surface 8, a lower bearing surface 9 and side relief flank surfaces 10 and cutting corners 11 defined therebetween. The cutting insert 3 is symmetrical about an axis 3' and indexable thereabout so as to present an operative cutting edge 12. Whilst the cutting insert 3 is double-sided, it should, however, be readily appreciated that a cutting tool assembly of the type to which the present invention refers may equally employ a single-sided cutting insert.

Figure 4:
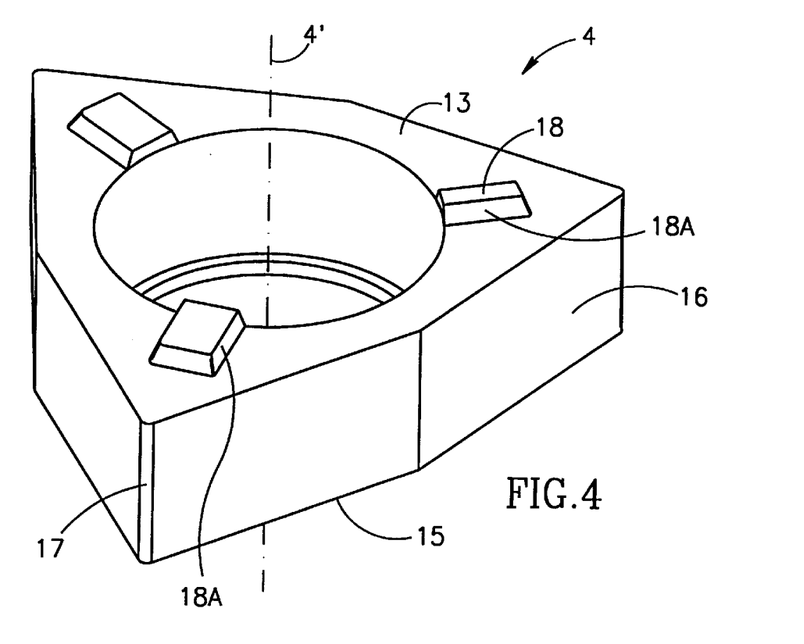
FIG. 4 is a perspective view of a preferred embodiment of a shim in accordance with the teachings of the present invention used in the turning toolholder assembly shown in FIG. 1.
Figure 5:
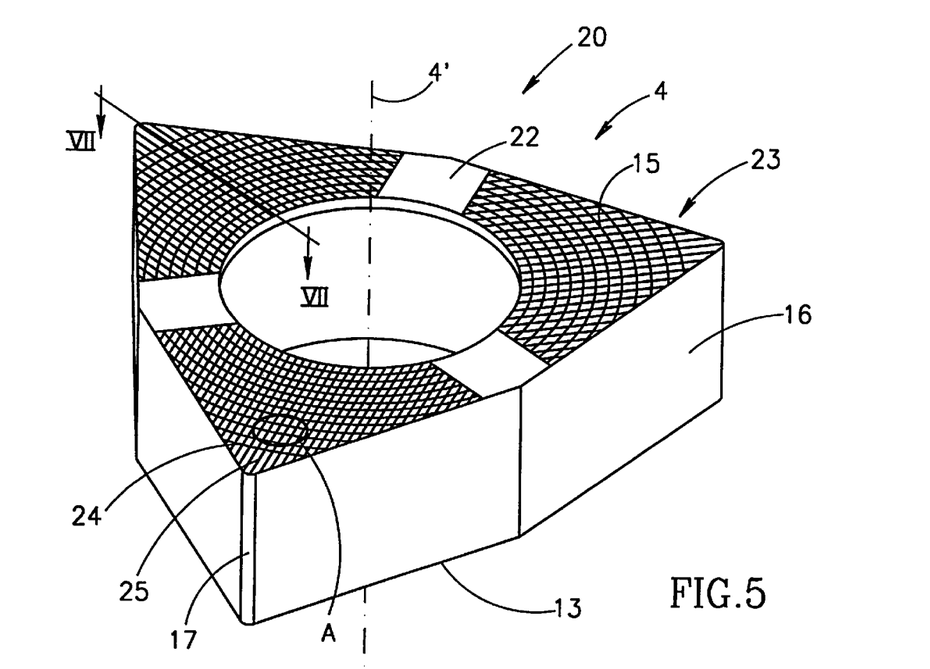
FIG. 5 is a perspective bottom view of the shim shown in FIG. 4.

As best seen in FIGS. 4 and 5, the shim 4 is of a generally prismatic shape having an upper supporting surface 13, a lower bearing surface 15 and side surfaces 16, pairs of adjacent side surfaces 16 meeting at corners 17 corresponding to respective cutting corners 11. The shim 4 is symmetrical about an axis 4', is of a shape generally corresponding to that of the cutting insert 3 and is of a size slightly smaller than that of the cutting insert 3. The shim's upper supporting surface 13 and lower bearing surface 15 are preferably planar ground or lapped.

Figure 3:
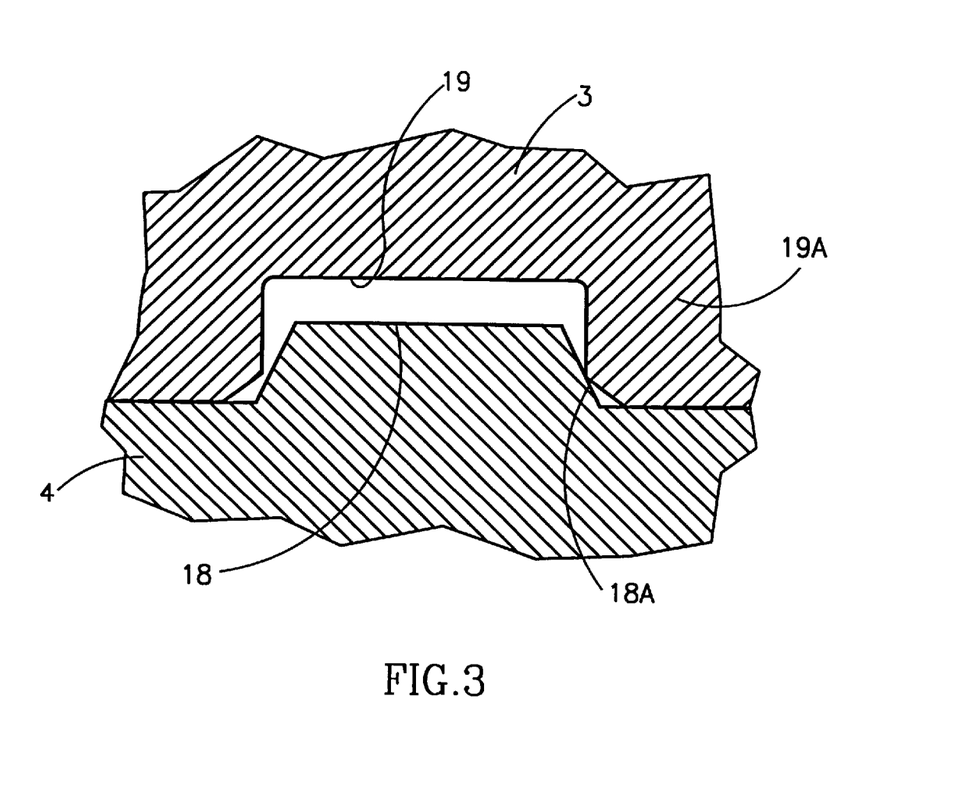
FIG. 3 is a close-up cross sectional view of the engagement between the shim and the cutting insert of the turning toolholder assembly shown in FIG. 2 as taken along line III—III.

As best seen in FIGS. 2, 3 and 4, the shim's upper supporting surface 13 is formed with projections 18 having tapering side walls 18A which are adapted to abut against side walls 19A of recesses 19 provided on the cutting insert's lower bearing surface 9 so as to inhibit displacement of the cutting insert 3 relative to the shim 4 due to radial and feed component forces acting during a turning operation.

As shown in FIG. 5, the shim's lower bearing surface 15 is formed with a pattern of protrusions, generally designated 20, divided by substantially radially extending recessed portions 22 directed towards midpoints along the shim's side surfaces 16 so as to create regions of protrusions 23 at each of the shim's corners 17. The recessed portions 22 are designed to achieve better contact between the shim's lower bearing surface 15 and the pocket base wall 2A occurs at three relatively far apart spaced apart contact areas, thereby ensuring the more stable seating of the shim 4 within the insert receiving pocket 2.

Figures 6, 7:
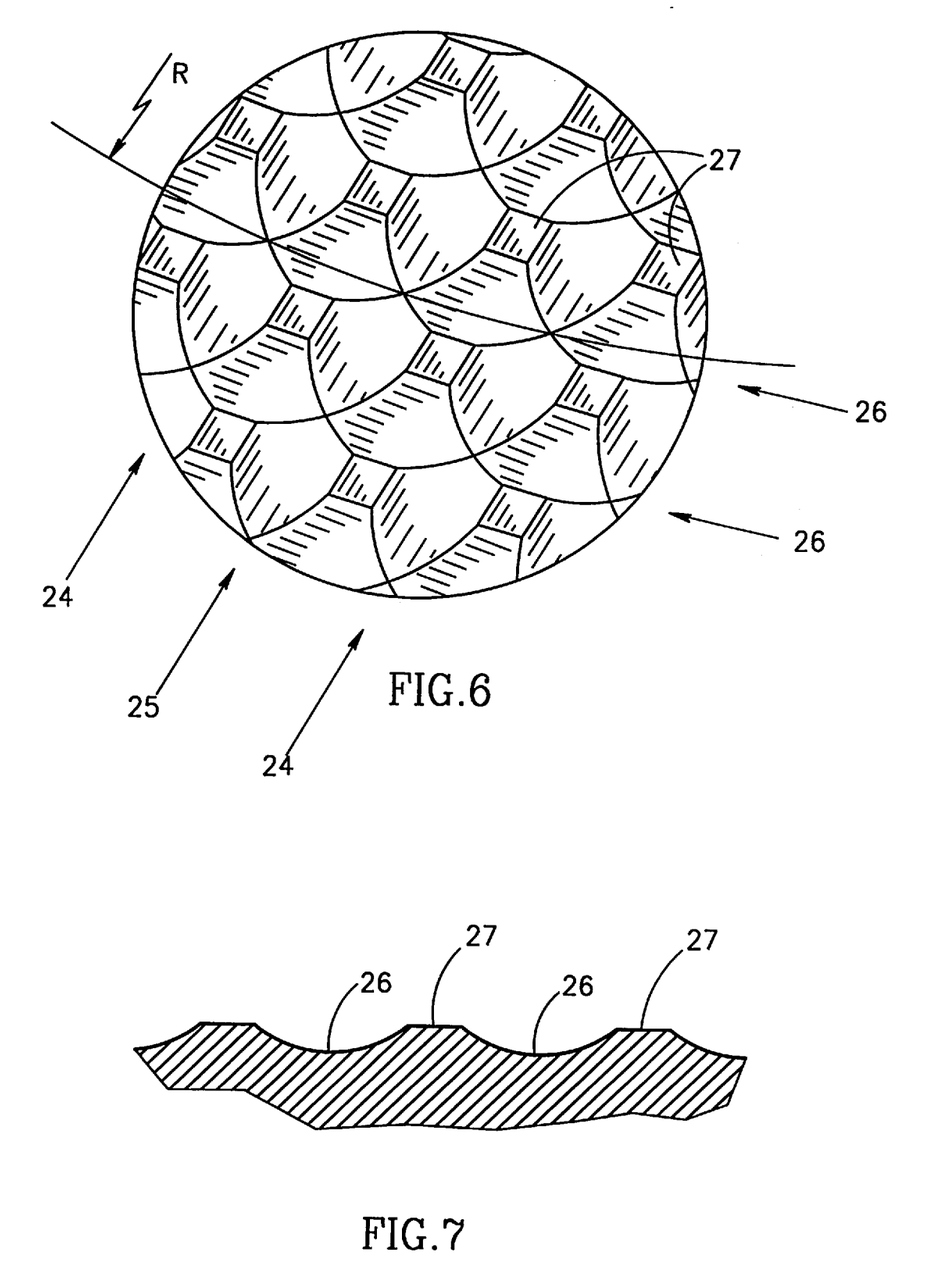
FIG. 6 is a close-up view of a portion of the lower bearing surface designated A of the shim as shown in FIG. 5.
FIG. 7 is a cross-sectional view of the shim as shown in FIG. 5 taken along a line VII—VII.

As also shown in FIG. 5, each region of protrusions 23 is formed by the intersection between a first array of substantially straight grooves 24 deployed parallel to a bisector 25 of a shim corner 17 and a second array of curved grooves 26 deployed radially with respect to the shim's an axis 4'. Thus, as best seen in FIG. 6, each protrusion 27 is, in effect, the remaining generally pyramidal shaped, protruding cusp formed at the intersection of two pairs of transversely directed, adjacent spaced apart grooves. Preferably, as best seen in FIG. 7, the grooves have a concave profile by virtue of which the protrusions 27 are rendered their tapered configuration. Whilst there are no strict requirements regarding the pitch of each array of grooves 24 and 26 or the depth of the grooves of each array of grooves 24 and 26, it should be noted that the upper surfaces of the protrusions 27 are required to be of a sufficiently small area that they readily penetrate the base wall 2A.

Figure 8:
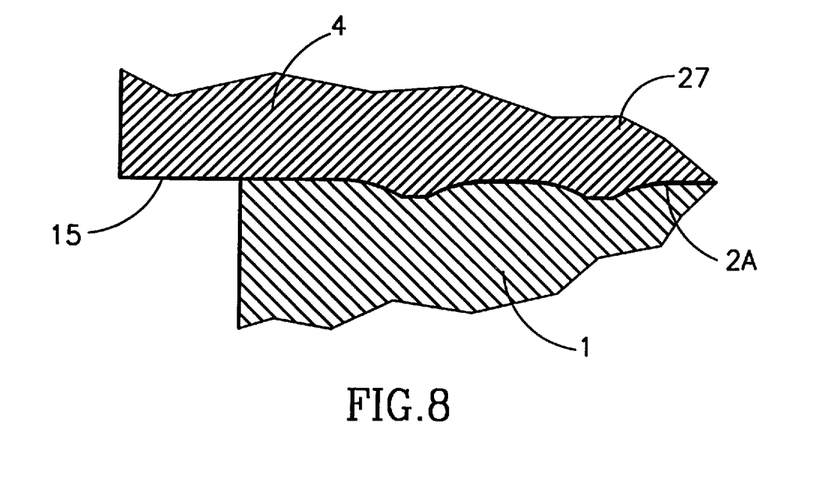
FIG. 8 is an enlarged cross-sectional view of a portion designated B of the turning toolholder assembly as shown in FIG. 2.
Figure 9:
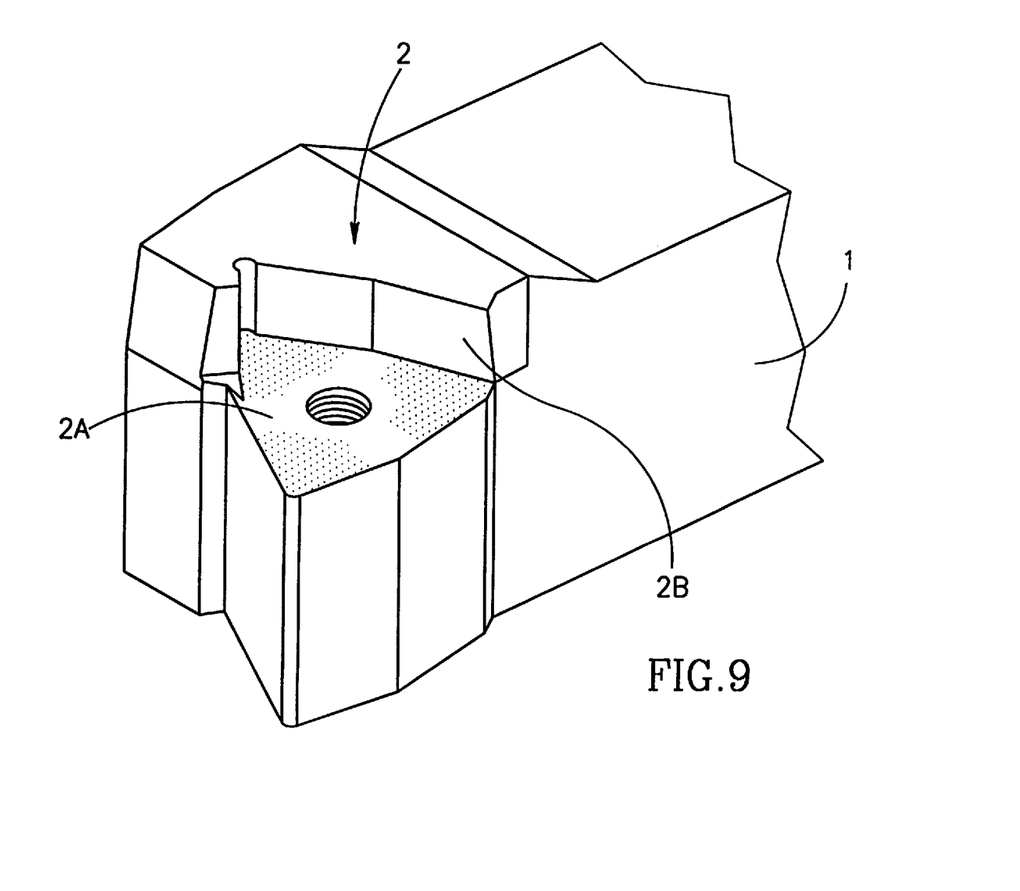
FIG. 9 is a perspective view of an indented pocket base wall of a tool holder after use and with the shim and the cutting insert removed.
Figure 10:
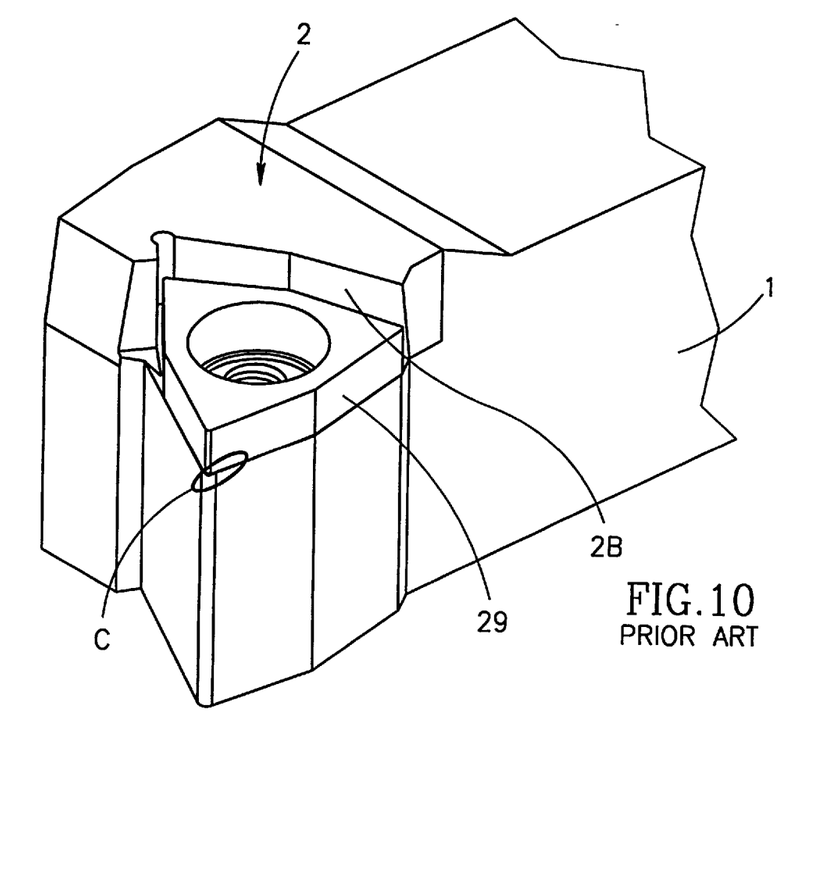
FIGS. 10 and 11 are, respectively, a perspective view of a tool holder with a conventional shim and an enlarged cross-sectional view of an area C thereof showing a plastic deformation of the pocket base wall.
Figure 11:
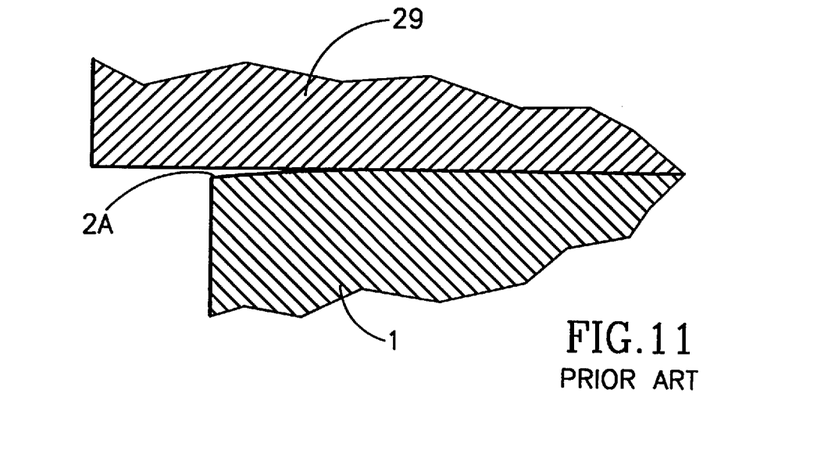

Reverting back to FIG. 1, the tangential component $F_\pi$ of the cutting forces acting upon the operative cutting edge 12 during a turning operation causes the protrusions 27 to penetrate the base wall 2A, as facilitated by their tapered configuration, as shown in FIG. 8 so as to render the appearance shown in FIG. 9 at those areas against which the three regions of protrusions 23 bear against. The penetration into the base wall 2A by the protrusions 27 provides for the distribution of the tangential component $F_\pi$ of the cutting force over a large contact area, thereby decreasing local stresses and inhibiting the localization of plastic deformation at the area of the pocket base wall adjacent to the operative cutting corner such as shown in FIG. 11 as hitherto occurred in the case of conventional shims 29. At the same time, the engagement between the contacting surfaces of the shim 3 and the base wall 2A inhibits displacement of the shim 4 relative to the base wall 2A by means of frictional forces induced in the protrusions 27 reacting against the radial component $F_R$ and the feed force component $F_X$ of the cutting forces. Therefore, the combined effect of the penetration of the base wall 2A by the protrusions 27 is the stable seating of the shim 4 in the insert receiving pocket 2. Finally, the secure mounting of the cutting insert 3 on the shim 4 is achieved by the provision of their mutual engagement means as described hereinabove.

While the invention has been described with respect to a limited number of embodiments, it will be appreciated that many variations, modifications and other applications of the invention can be made by those ordinarily skilled in the art.

Figure 12:
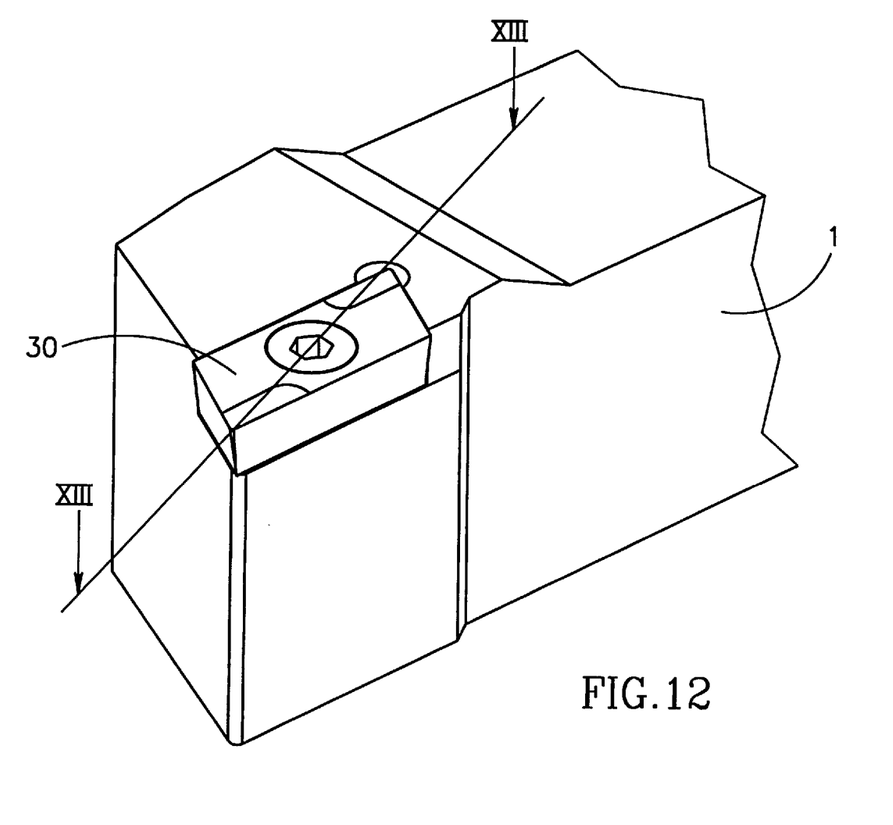
FIGS. 12 and 13 are, respectively, a perspective view and a cross-sectional view of a cutting tool assembly including a single-sided cutting insert in accordance with the teachings of the present invention.
Figure 13:
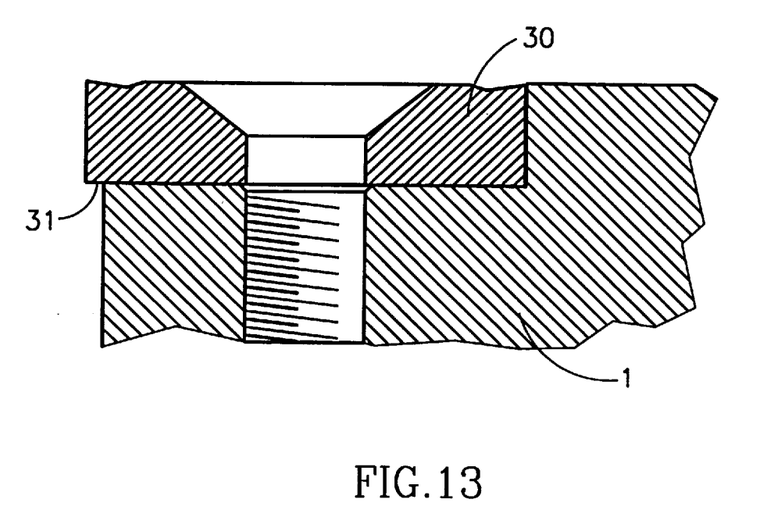

Thus, for example, as shown in FIGS. 12 and 13, a cutting tool assembly of the type to which the present invention refers may be used without a shim when a single-sided cutting insert 30 is provided with a lower bearing surface 31 similar to that of the shim's lower bearing surface 15.

In addition, the pattern of protrusions 20 can be over an entire shim's lower bearing surface or, alternatively, a shim's lower bearing surface can be formed with only one such region of protrusions 23 which is then positioned so as to support the insert's operative cutting corner.

It should also be mentioned that the pattern of protrusions must not necessarily be formed by the intersection between two pairs of transversely directed, adjacent spaced apart grooves but may rather comprise a plurality of protrusions of any other suitable configuration.

I claim:

1. A cutting tool assembly comprising:
   (a) a tool holder formed with an insert retaining pocket initially having a substantially smooth, planar pocket base wall; and
   (b) a single-sided cutting insert having an upper surface, a lower surface and side relief flank surfaces, and a cutting corner defined therebetween,
      said cutting insert being of a material substantially harder than said pocket base wall of said tool holder, said lower surface being formed with a patterned region of protrusions localized adjacent said cutting corner, said patterned region of protrusions being at least partially bounded by a substantially non-patterned recessed area.

2. The assembly of claim 1, wherein said patterned region of protrusions is formed by an intersection between a first array of grooves parallel to a bisector of said cutting corner, and a second array of grooves substantially transverse to said first array of grooves.

3. The assembly of claim 1, wherein said cutting insert has a plurality of indexable insert corners, each corner associated with a patterned region of protrusions, said patterned regions of protrusions being spaced apart from one another.

4. The assembly of claim 3, wherein adjacent patterned regions of protrusions are separated by a recessed portion.

5. The assembly of claim 3, wherein said cutting insert is substantially trigon-shaped and its lower surface is formed with three spaced apart patterned regions of protrusions.

6. The assembly of claim 3, wherein said cutting insert is substantially parallelogram-shaped, and its lower surface is formed with two spaced apart patterned regions of protrusions.

7. A method for seating a cutting insert in a tool holder, said method comprising the steps of:
   (a) providing a tool holder initially having a substantially smooth, planar pocket base wall;
   (b) providing a single-sided cutting insert having an upper surface, a lower surface, side relief flank surfaces and a cutting corner defined therebetween, said cutting insert being formed of a material substantially harder than said pocket base wall, said lower surface being provided with a patterned region of protrusions localized adjacent said cutting corner, said patterned region of protrusions being at least partially bounded by a substantially non-patterned recessed area;
   (c) clamping the cutting insert atop the substantially smooth, planar pocket base wall such that said patterned region of protrusions is proximate to an operative cutting corner of the cutting insert, when said cutting insert is clamped in said tool holder; and
   (d) applying a downward force on said cutting insert sufficient to cause said patterned region of protrusions to penetrate the substantially smooth, planar pocket base wall and form an indented seating surface in at least a region of the pocket base wall supporting said operative cutting corner.

8. The method of claim 7, wherein, in step (b), said cutting insert is substantially trigon-shaped, and its lower surface is formed with three spaced apart patterned regions of protrusions.

9. The method of claim 7, wherein, in step (b), said cutting insert is substantially parallelogram-shaped, and its lower surface is formed with two spaced apart patterned regions of protrusions.

10. The method of claim 7, wherein, in step (d), the downward force is applied to said operative cutting corner during a cutting operation.

11. A single-sided cutting insert for use with a tool holder formed with an insert retaining pocket initially having a substantially smooth, planar pocket base wall,
   the single-sided cutting insert having an upper surface, a lower surface and side relief flank surfaces, and a cutting corner defined therebetween,
   said cutting insert being of a material substantially harder than said pocket base wall of said tool holder, said lower surface being formed with a patterned region of protrusions localized adjacent said cutting corner, said patterned region of protrusions being at least partially bounded by a substantially non-patterned recessed area.

12. The cutting insert of claim 11, wherein said patterned region of protrusions is formed by an intersection between a first array of grooves parallel to a bisector of said cutting corner, and a second array of grooves substantially transverse to said first array of grooves.

13. The cutting insert of claim 11, wherein said cutting insert has a plurality of indexable insert corners, each corner associated with a patterned region of protrusions, said patterned regions of protrusions being spaced apart from one another.

14. The cutting insert of claim 13, wherein adjacent patterned regions of protrusions are separated by a recessed portion.

15. The cutting insert of claim 13, wherein said cutting insert is substantially trigon-shaped, and its lower surface is formed with three spaced apart patterned regions of protrusions.

16. The cutting insert of claim 13, wherein said cutting insert is substantially parallelogram-shaped, and its lower surface is formed with two spaced apart patterned regions of protrusions.

* * * * *